(12) United States Patent
Park et al.

(10) Patent No.: US 9,321,485 B2
(45) Date of Patent: Apr. 26, 2016

(54) SMART PARKING ASSISTANT SYSTEM AND METHOD OF CONTROLLING PARKING ALIGNMENT

(71) Applicant: Hyundai Motor Company, Seoul (KR)

(72) Inventors: Jin Ho Park, Gyeonggi-do (KR); Gilwon Seo, Gyeonggi-do (KR); Joo Woong Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 146 days.

(21) Appl. No.: 14/143,379

(22) Filed: Dec. 30, 2013

(65) Prior Publication Data
US 2014/0350804 A1    Nov. 27, 2014

(30) Foreign Application Priority Data
May 22, 2013    (KR) .................. 10-2013-0057876

(51) Int. Cl.
*B62D 15/02*    (2006.01)
*B60W 30/06*    (2006.01)
*B60W 10/20*    (2006.01)

(52) U.S. Cl.
CPC ................. *B62D 15/0285* (2013.01)

(58) Field of Classification Search
CPC ............. B62D 15/0285; B62D 15/027; B62D 15/028; B62D 15/025; B62D 15/0265
See application file for complete search history.

(56) References Cited

U.S. PATENT DOCUMENTS

| | | | |
|---|---|---|---|
| 6,275,231 B1* | 8/2001 | Obradovich | B60R 16/0231 345/156 |
| 2009/0243888 A1* | 10/2009 | Kawabata | G08G 1/166 340/932.2 |
| 2010/0049402 A1* | 2/2010 | Tanaka | B60R 1/00 701/41 |
| 2010/0259420 A1* | 10/2010 | Von Reyher | B62D 15/028 340/932.2 |
| 2012/0173080 A1* | 7/2012 | Cluff | 701/42 |
| 2013/0144492 A1* | 6/2013 | Takano | B62D 15/0285 701/42 |

\* cited by examiner

*Primary Examiner* — Robert Hodge
*Assistant Examiner* — Tinh Dang
(74) *Attorney, Agent, or Firm* — Mintz Levin Cohn Ferris Glovsky and Popeo, P.C.; Peter F. Corless

(57) ABSTRACT

A smart parking assistant system and a method of controlling parking alignment are provided. The smart parking assistant system includes a determination controller configured to confirm a driver intention of whether to perform an automatic parking alignment function. A parking alignment controller is configured to perform the automatic parking alignment function when the driver intention is confirmed.

5 Claims, 3 Drawing Sheets

SMART PARKING ASSISTANT SYSTEM AND METHOD OF CONTROLLING PARKING ALIGNMENT

CROSS-REFERENCE TO RELATED APPLICATION

This application claims priority to and the benefit of Korean Patent Application No. 10-2013-0057876 filed in the Korean Intellectual Property Office on May 22, 2013, the entire contents of which are incorporated herein by reference.

BACKGROUND (a) Field of the Invention

The present invention relates to a smart parking assistant system (hereinafter, referred to as "SPAS") and a method of controlling parking alignment. More particularly, the present invention relates to a parking alignment function that automatically corrects a direction angle of a vehicle and the distance between the vehicle and left and right objects by detecting the left and right objects.

(b) Description of the Related Art

A driver uses SPAS for aid in parking a vehicle in a parking space. The SPAS may provide a perpendicular parking assist function as well as a parallel parking assist function. In particular, the perpendicular parking function provides a parking alignment to automatically correct a direction angle of a vehicle and distances between the vehicle and left and right objects by detecting the left and right objects when the vehicle enters a parking space. To perform the parking alignment function, repeated forward and backward movement of the vehicle is required. When a distance and a direction angle of the system become reference distance and direction angle margins, respectively, parking support is terminated.

Presently, the parking alignment function is not logically separated and implemented from the perpendicular parking function. Accordingly, when it is determined that the SPAS needs an operation of the parking alignment function, although a driver determines that the operation of the parking alignment function is not necessary for completion and termination of parking support, the SPAS performs the parking alignment function regardless of the intention of the driver.

to terminate the perpendicular parking function without parking alignment, the driver must perform an operation which a system may determine an abnormal condition such as a forced operation of a steering wheel controlled by the SPAS to terminate the perpendicular parking function. However, when an alignment reference determined by the driver is different from a reference of the SPAS, the driver feels inconvenience that results in deterioration of the productivity of the SPAS. Further, after the driver manually performs perpendicular parking, the drives may wish to use the SPAS for parking alignment. However, such a selective function is not provided.

The above information disclosed in this section is only for enhancement of understanding of the background of the invention and therefore it may contain information that does not form the prior art that is already known in this country to a person of ordinary skill in the art.

SUMMARY

The present invention provides a smart parking assistant system and a method of controlling parking alignment that may selectively perform a parking alignment function according to determination of a driver.

An exemplary embodiment of the present invention provides a smart parking assistant system that may include: a determination controller configured to confirm whether to perform an automatic parking alignment function based on driver intention; and a parking alignment controller configured to perform the automatic parking alignment function when the function is confirmed.

The determination controller may be configured to confirm a driver input instructing the automatic parking alignment function to be generated. In addition, the determination controller may be configured to confirm the driver intention when a defined first gear stage is input among transmission gear stages. The determination controller may also be configured to determine whether the driver input is generated after guiding the driver input.

The smart parking assistant system may further include a perpendicular parking controller configured to perform an automatic perpendicular parking function, wherein the determination controller may be configured to guide the driver input when the automatic perpendicular parking function is completed, and confirm driver intention when the driver input instructing the automatic parking alignment function is generated.

The determination controller may be configured to confirm the driver intention when a reference distance and a reference direction angle are not satisfied during control of the automatic perpendicular parking. The determination controller may also be configured to determine the driver intention when the defined first gear stage is input, and when a defined second gear stage is input determine that the no driver intention, and the perpendicular parking controller may be configured to terminate the automatic perpendicular parking function after the automatic parking alignment function is completed, and terminate the automatic perpendicular parking function without performing the parking alignment function when the driver intention is not confirmed. The determination controller may be configured to guide a second driver input for automatic parking alignment when a defined first driver input is generated, and confirm the driver intention when the second driver input is generated.

The first driver input may include operations of preset times of a parking switch when an ignition switch is turned-on a gear stage is a neutral gear stage, and the second driver input may include an input of a defined first gear stage.

Another exemplary embodiment of the present invention provides a method of controlling parking alignment by a smart parking assistant system that may include: controlling automatic perpendicular parking; confirming a driver intention of whether to perform an automatic parking alignment function; and performing the automatic parking alignment function when the driver intention is confirmed.

The confirming of the driver intention may include guiding driver input; and confirming the driver intention when the driver input is generated. The guiding of the driver input may include: determining whether a reference distance and a reference direction angle are satisfied during the controlling automatic perpendicular parking; and guiding the driver input when the reference distance and the reference direction angle are not satisfied. The guiding of the driver input may include outputting a sound announcement or a text announcement to guide input of a defined first gear stage.

The confirming of the agreement of the driver may include confirming the driver intention when a defined first gear stage is input; and confirming no driver intention when a defined second gear stage is input, after performing the automatic parking alignment function, terminating an automatic perpendicular parking function when the automatic parking alignment function is completed when the driver intention is confirmed; and terminating an automatic perpendicular parking function when the driver intention is not confirmed.

Yet another exemplary embodiment of the present invention provides a method of controlling parking alignment by a smart parking assistant system that may include: confirming a driver input for an automatic parking alignment function in a manual parking mode; and performing the automatic parking alignment function when the driver input is generated.

Still another exemplary embodiment of the present invention provides the confirming the driver input may include: confirming a defined first driver input and confirming a defined second driver input. The performing of the automatic parking alignment function may include performing the automatic parking alignment function when the second driver input is generated. The confirming of the driver input may include: generating the first driver input that represents a stop state when an ignition switch is turned-on and having operations of preset times of a parking switch when a gear stage is a neutral gear stage; outputting a sound announcement or a text announcement to guide input of a defined first gear stage when the automatic parking alignment function is required; and generating the second driver input including an input of the defined second gear stage.

Figure 1:
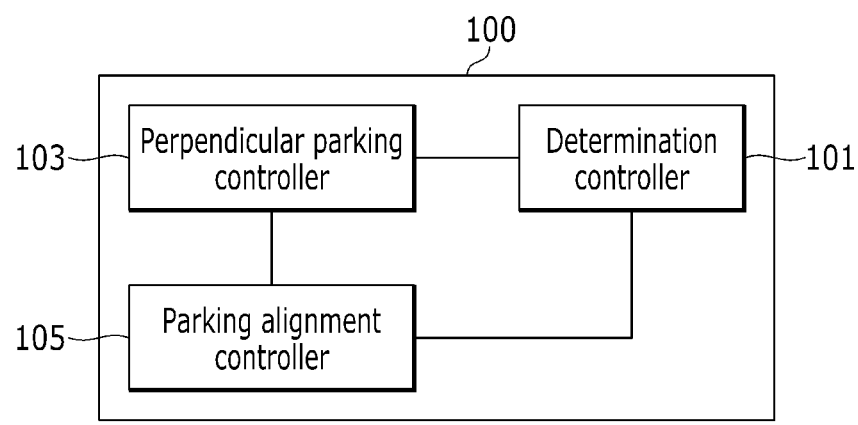
FIG. 1 is an exemplary block diagram illustrating a configuration of SPAS according to an exemplary embodiment of the present invention.

| Description of symbols | |
| --- | --- |
| 100: smart parking system | 101: determination controller |
| 103: perpendicular parking controller | 105: parking alignment controller |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a SPAS and a method of controlling parking alignment according to an exemplary embodiment of the present invention will be described in detail with reference to the accompanying drawings.

FIG. 1 is an exemplary block diagram illustrating a configuration of SPAS according to an exemplary embodiment of the present invention. Referring to FIG. 1, SPAS 100 may be configured to search a parking available area using ultrasonic wave sensors to search a space at front, rear, left, and right sides of a vehicle, and operates a steering wheel to assist parking.

An exemplary embodiment of the present invention illustrates an exemplary configuration of a parking alignment function of the SPAS 100 associated with contents implemented according to a selection of the user. The SPAS 100 may include a determination controller 101, a perpendicular parking controller 103, and a parking alignment controller 105. The SPAS 100 may be a high level controller having a processor and a memory and configured to execute the determination controller 101, the perpendicular parking controller 103, and the parking alignment controller 105 which may each have a processor and memory.

The determination controller 101 may be configured to confirm a driver intention with respect to presence of execution of an automatic parking alignment function. When a driver input instructing automatic parking alignment is generated, the determination controller 101 may be configured to confirm the driver intention. When a defined first gear stage among transmission gear stages is input after guiding the driver input, the determination controller 101 may be configured to confirm that the driver intention. The defined first gear stage may be a forward gear.

The perpendicular parking controller 103 may be configured to implement an automatic perpendicular parking function of the SPAS. The perpendicular parking of the vehicle signifies a form capable of parking a plurality of vehicles at left and right sides of a quadrangle area. The perpendicular parking controller 103 may be configured to recognize a parking space and a road width while detecting an object located at a side of the vehicle along a running direction of the vehicle using a sensor such as an ultrasonic wave sensor. After recognizing the parking space and the road width, the perpendicular controller 103 may be configured to determine a parking path. Further, the perpendicular controller 103 may be configured to execute perpendicular parking of the vehicle along the parking path. The parking alignment controller 105 may be configured to implement a parking alignment function that detects left and right objects to automatically correct a direction angle of the vehicle, and distances between of the vehicle and the left and right objects. In particular, when the driver intention is confirmed from the determination controller 101, the parking alignment controller 105 may be configured to perform automatic parking alignment.

Hereinafter, a method of controlling parking alignment in the perpendicular parking mode and the manual parking mode will be described.

Figure 2:
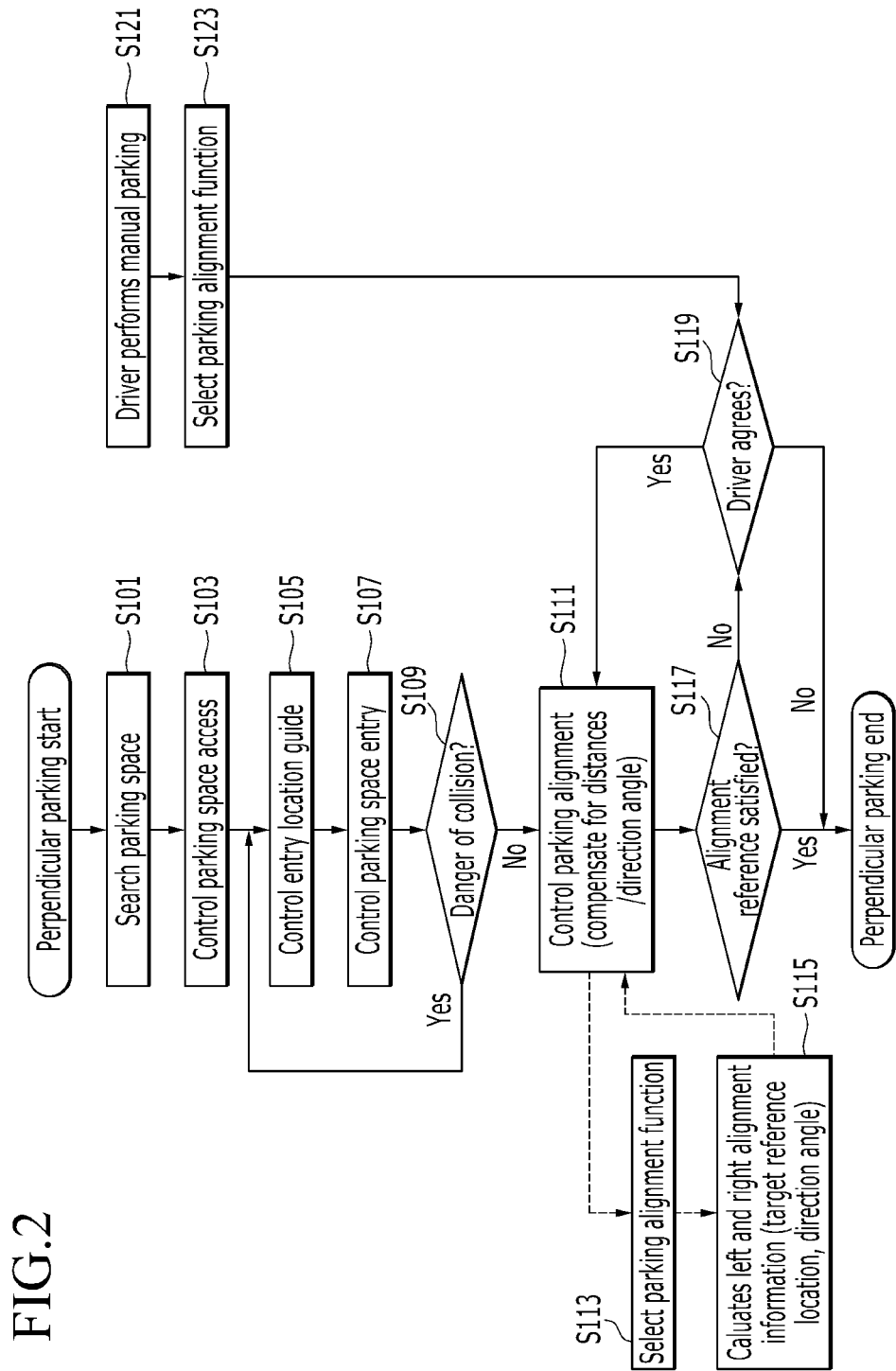
FIG. 2 is an exemplary flowchart illustrating a method of controlling parking alignment in a perpendicular parking mode according to an exemplary embodiment of the present invention.

FIG. 2 is an exemplary flowchart illustrating a method of controlling parking alignment in a perpendicular parking mode according to an exemplary embodiment of the present invention. Referring to FIG. 2, the perpendicular parking controller 103 may begin execution of the perpendicular parking mode. The perpendicular parking controller 103 may be configured to search a parking space (S101) and perform parking space access control (S103).

Next, the perpendicular parking controller 103 may be configured to perform entry location guide control (S105) and perform parking space entry control (S107). In addition, the perpendicular parking controller 103 may be configured to determine whether there is a danger of collision (S109). In particular, when there is the danger of collision, the perpendicular parking controller 103 may return to step S105.

Alternatively, when there is no the danger of collision, the parking alignment controller 105 may be configured to execute parking alignment, that is, may be configured to compensate for and maintain distances and a direction angle (S111). In particular, the parking alignment controller 105 may be configured to detect left and right objects (S113) and calculate left and right alignment information, that is, a target reference location and the direction angle (S115). Further, the parking alignment controller 105 may be configured to compensate for and maintain the distances and the direction angle using calculated information.

Next, the parking alignment controller 105 may be configured to determine whether the distances and the direction angle satisfy a reference distance and a reference direction angle (S117). In other words, the parking alignment controller 105 may be configured to detect distances between the vehicle and left and right objects, and a direction angle of the vehicle in a parking space based on a sensor data processing result to calculate the distances between the vehicle and left and right objects, and a direction angle of the vehicle to determine whether the distances and the direction angle satisfy a defined alignment reference. Further, when the distances and the direction angle satisfy the reference distance and the reference direction angle, the perpendicular parking controller 103 may be configured to terminate the execution of perpendicular parking.

Alternatively, when the distances and the direction angle do not satisfy the reference distance and the reference direction angle, the determination controller 101 may be configured to confirm driver invention as to whether to perform parking alignment based on a request of the parking alignment controller 105 (S119). In particular, the determination controller 101 may be configured to perform a driving guide for the driver intention. For example, the determination controller 101 may be configured to output a text such as "Parking assistance is completed. Input forward gear (e.g., drive 'D' stage gear) for vehicle alignment" on a system screen disposed within the vehicle or output a sound announcement. Further, when a defined first gear stage, for example, the forward gear (e.g., D stage gear) is input, the determination controller 101 may be configured to confirm the driver intention.

Alternatively, when a defined second gear stage, for example, when a parking gear (e.g., P stage gear) is input, the determination controller 101 may be configured to confirm no driver intention (e.g., that driver intention is not satisfied). In particular, when the driver intention is confirmed, the parking alignment controller 105 may be configured to perform the parking alignment function based on a request of the determination controller 101 (S111). In other words, the parking alignment controller 105 may be configured to search the left and right objects to calculate left and right alignment information. That is, the parking alignment controller 105 may be configured to calculate a target reference distance and a target reference direction angle. In addition, the parking alignment controller 105 may be configured to compensate for the distance and the direction angle based on the calculated target reference distance and the reference direction angle to perform parking alignment to satisfy the reference. Alternatively, when it is confirmed that the driver intention is not satisfied, the perpendicular parking controller 103 may be configured to terminate the perpendicular parking mode.

Figure 3:
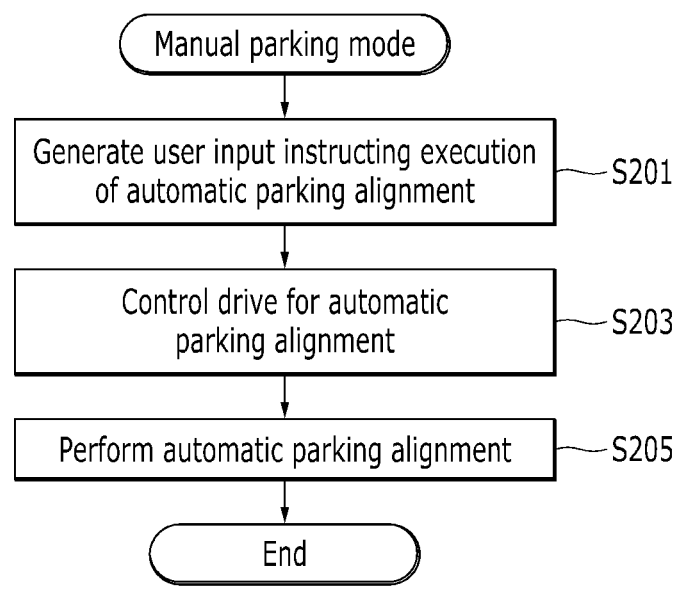
FIG. 3 is an exemplary flowchart illustrating a method of controlling parking alignment in a manual parking mode according to an exemplary embodiment of the present invention.

Moreover, when a parking alignment function is selected (S123) while the driver is performing a manual parking (S121), the determination controller 101 may be configured to confirm a driver intention (S119), and then the parking alignment function may be performed. FIG. 3 is an exemplary flowchart illustrating a method of controlling parking alignment in a manual parking mode according to an exemplary embodiment of the present invention. Referring to FIG. 3, the determination controller 101 may be configured to confirm a defined first driver input in a manual parking mode where a driver manually performs perpendicular parking (S201). The first driver input may represent a user input instructing execution of automatic parking alignment.

According to an exemplary embodiment, the first driver input may represent a stop state when an ignition switch is turned on, and may have operations of preset times of a parking switch when a gear stage is a neutral gear stage (e.g., N stage gear). The preset times may be, for example, one. The stop state may include when a vehicle completely stops and when vehicle speed is less than or equal to a predetermined speed.

When the first driver input is generated, the determination controller 101 may be configured to execute a drive for automatic parking alignment (S203). In other words, the determination controller 101 may be configured to determine a request for a parking alignment function to guide the second driver input. For example, in response to a user input, the determination controller 101 may be configured to output a text such as "input forward gear (D stage gear) for execution of a parking alignment function" to a system screen disposed within the vehicle or output a sound announcement. Further, when the forward gear (D stage gear) is input (e.g., the second driver input), the parking alignment controller 105 may be configured to perform automatic parking alignment (S205).

According to an exemplary embodiment of the present invention, since the parking alignment function may be selectively performed according to determination of the driver, for example, to use the parking alignment function after the driver manually performs perpendicular parking, the smart parking assistant system may be operated using the parking alignment function of the SPAS by reflecting intention of the driver. In this manner, convenience of the driver may be improved by supporting the parking alignment function during the manual parking. Further, although the parking alignment function operation is required due to determination of the SPAS, since the parking alignment function operation may be selectively implemented by intention of the driver, an operation of a driver friendly system may be possible.

The exemplary embodiment of the present invention described above may be implemented by not only an apparatus and a method but also a program realizing a function that corresponds to a configuration of the exemplary embodiment of the present invention or a recording medium recording the program.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A smart parking assistant system of a vehicle comprising:
    a determination controller confirming a driver intention for performing an automatic parking alignment function that includes detecting left and right objects and automatically correcting a direction angle of the vehicle and distances between the vehicle and the left and right objects; and
    a parking alignment controller performing the automatic parking alignment function when the driver intention is confirmed,
    wherein the determination controller guides a second driver input for performing the automatic parking alignment function when a defined first driver input is generated, and confirms the driver intention when the second driver input is generated,
    wherein the first driver input includes operations of preset times of a parking switch in a state that the vehicle is stopped, an ignition switch is turned-on and a gear stage is a neutral gear stage, and
    wherein the second driver input includes an input of a defined first gear stage.

2. The smart parking assistant system of claim 1, further comprising:
    a perpendicular parking controller performing an automatic perpendicular parking function,
    wherein the determination controller guides a driver input instructing the automatic parking alignment function when the automatic perpendicular parking function is completed, and confirms the driver intention when the driver input instructing the automatic parking alignment function is generated.

3. The smart parking assistant system of claim 2, wherein the determination controller confirms presence of the driver intention when a reference distance and a reference direction angle are not satisfied during execution of the automatic perpendicular parking.

4. The smart parking assistant system of claim 2, wherein the determination controller confirms that the driver intention is present when the defined first gear stage is input, and determines that the driver intention is absent when a defined second gear stage is input, and
    wherein the perpendicular parking controller terminates the automatic perpendicular parking function after the automatic parking alignment function is completed when the driver intention is present, and terminates the automatic perpendicular parking function without performing the parking alignment function when the driver intention is absent.

5. A method of controlling parking alignment by a smart parking assistant system for a vehicle, the method comprising:
    confirming, by the controller, a driver input for an automatic parking alignment function that includes detecting left and right objects and automatically correcting a direction angle of the vehicle and distances between the vehicle and the left and right objects in a manual parking mode; and
    performing, by the controller, the automatic parking alignment function when the driver input is generated,
    wherein the confirming the driver input includes:
    confirming, by the controller, generation of a first driver input when operations of preset times of a parking switch in a state that the vehicle is stopped, an ignition switch is turned-on and a gear stage is a neutral gear stage;
    outputting, by the controller, a sound announcement or a text announcement to guide input of a first gear stage when the first driver input is confirmed; and
    confirming, by the controller, generation of a second driver input including when the first gear stage is input,
    wherein the automatic parking alignment function is performed when the second driver input is generated.

* * * * *